United States Patent [19]

Welscher

[11] Patent Number: 5,467,598
[45] Date of Patent: Nov. 21, 1995

[54] DISPLACEMENT OVERRIDE/BRAKE CONTROL CIRCUIT

[75] Inventor: William L. Welscher, Ankeny, Iowa

[73] Assignee: Sauer Inc., Ames, Iowa

[21] Appl. No.: 976,952

[22] Filed: Nov. 16, 1992

[51] Int. Cl.⁶ .................................................. F16D 31/02
[52] U.S. Cl. ............................................................ 60/436
[58] Field of Search ................................................ 60/436

[56] References Cited

U.S. PATENT DOCUMENTS

| Re. 32,885 | 3/1989 | Graham . | |
|---|---|---|---|
| 3,637,264 | 1/1972 | Leiber et al. . | |
| 4,254,845 | 3/1981 | Braun . | |
| 4,495,767 | 1/1985 | Akiyama et al. | 60/436 |
| 4,571,941 | 2/1986 | Aoyagi et al. | 60/436 |
| 4,722,575 | 2/1988 | Graham . | |
| 4,749,236 | 6/1988 | Graham . | |
| 4,951,462 | 8/1990 | Graf | 60/444 |
| 5,010,733 | 4/1991 | Johnson | 60/489 |

Primary Examiner—F. Daniel Lopez
Attorney, Agent, or Firm—Zarley, McKee, Thomte, Voorhees, & Sease

[57] ABSTRACT

In a wheeled vehicle propelled by a hydrostatic transmission which has a variable displacement pump fluidly connected to a motor in a closed circuit for propulsion and a hydraulically-released brake for stopping the vehicle, a return to neutral and brake release circuit including: a system reservoir for holding fluid; a charge pump for drawing fluid from the reservoir and providing pressurized flow of same; a hydraulically-released brake operatively attached to the wheels of vehicle and the charge pump; a displacement control for providing differential pressure command signals to a servo piston for varying hydrostatic transmission displacement; a solenoid valve for interrupting the flow of fluid to the brake and displacement control, thus braking the vehicle and returning the variable pump to neutral; and a set of drain passages fluidly connecting the solenoid, displacement control and brake (through the solenoid) to the system reservoir so that the components may be immediately drained to allow the engagement of the hydraulically-released brake and return of the variable pump to neutral. Interrupting the fluid flow and draining the residual pressure, as described above, stops the vehicle quickly.

9 Claims, 3 Drawing Sheets

DISPLACEMENT OVERRIDE/BRAKE CONTROL CIRCUIT

BACKGROUND OF THE INVENTION

This invention relates to vehicles equipped with hydraulic systems for propel and hydraulic release braking for the rapid stopping of the same. More particularly, the present invention concerns a hydraulic circuit for simultaneously destroking a hydrostatic pump and releasing a hydraulic brake.

Hydrostatic transmissions, consisting of a hydraulic pump supplying fluid pressure to a hydraulic motor, are known to be useful for propulsion in a variety of vehicles. However, the stopping of such vehicles has proven a persistent problem. Under some conditions simply destroking the pump to a neutral or zero displacement setting, ceasing flow to the hydraulic motor, is sufficient to halt the vehicle. Unfortunately, when the vehicle has developed significant momentum before being commanded to stop, it may coast for a considerable distance. Similarly, a heavy vehicle descending a steep grade may even continue to accelerate when the pump is destroked. Because the wheels of the vehicle are actually driving the hydraulic motor shaft in this situation, the pump and motor roles are reversed. The pump, now acting as a motor, has been commanded to a neutral or zero displacement setting. At low swashplate angles very high speeds may be generated, because speed is a function of flow divided by displacement. Such high speed conditions may cause internal damage to the hydrostatic transmission (HST) or the engine of the vehicle. Worse yet, operators may find themselves riding a runaway piece of equipment.

To address the coasting and overspeed problems, it is known in the art to equip vehicles with hydraulic service brakes. Service brakes supplement the normal dynamic braking of the HST and insure that the vehicle can be more rapidly stopped in an emergency. One type of conventional brake is spring-activated and hydraulically-released. Hydraulic pressure from the HST or another source normally counteracts the spring force to prevent the brake from being applied. When the hydraulic pressure is drained from the brake release line, the spring is released to apply the brake. Under proper conditions, simultaneously destroking the pump and draining the brake release line is effective to rapidly stop the vehicle.

DISCUSSION OF THE PRIOR ART

Understandably, response time for braking is always a concern, especially in an emergency. Where the brake release line is pressurized and drained in a common circuit with the HST, response time problems are encountered. Such problems, relative to certain conventional circuits, are discussed below.

FIG. 1 shows a circuit currently used in conjunction with a hydrostatic pump 10 to provide the vehicle braking function. A manual displacement control (MDC) 12 is mounted on the hydrostatic pump 10 to control its displacement by controlling oil flow to and from a servo cylinder 14 which positions the pump swashplate 16. The supply port 18 of the MDC receives pressurized fluid (charge pressure) from a charge pump 20 through a supply orifice 22, and has a drain port 24 which is connected to pump case pressure 26.

Supply flow to the MDC 12 must pass through a solenoid valve 28. Solenoid valve 28 can allow fluid to flow to the MDC 12 or can interrupt such flow and can drain supply port 18 of the MDC, depending on the valve's position. The solenoid valve in FIG. 1 is shown in its electrically de-energized position, which blocks charge pressure from reaching MDC supply port 18. With solenoid valve 28 in this position, the MDC is overridden and the pump swashplate 16 is allowed to return to neutral under the influence of swashplate centering springs 29. Also, the brake release line 25 and solenoid 28 are drained into system reservoir 27, thereby allowing the actuating spring (not shown) to set the brake.

To release the brake and to allow normal pump operation, the solenoid valve 28 must be electrically energized to move it to the other porting position (schematically shown on the right in FIG. 1). In this position, charge pressure is communicated to both brake line 25 to release the brake and supply port 18 of the MDC to allow normal operation of the control and, thereby, the vehicle.

Due to the difference between pump case pressure and system reservoir pressure, an operational problem occurs in the overridden mode. Pump case pressure is always higher than reservoir pressure because there is always flow from the pump case to the reservoir through an external drain line 11 which usually includes an oil cooler 13. Normally, at the instant displacement control 12 is overridden by the solenoid valve 28, the displacement command is in a non-neutral position (i.e., the displacement valve is in the left or right porting position in FIG. 1.). In any non-neutral position, one servo is connected to pump case 26 pressure through the MDC drain port 24, and the other servo is connected to system reservoir pressure 27 through the MDC supply port 18 and the solenoid valve 28. If the difference in pump case pressure 26 and system reservoir pressure 27 is great enough to overcome the force of the servo/swashplate centering springs 29, the pump will be pushed into stroke, possibly creating enough hydrostatic system pressure to cause vehicle motion, even though the brake is applied.

The circuit of FIG. 1 includes a check valve 30 and a drain orifice 32 which are intended to avoid the problem described above. The check valve 30 allows pressure in the MDC drain port 24 to exhaust to system reservoir pressure 27, reducing the difference in pressures between the MDC supply 18 and drain ports 24, and thus the pressure differential on the servo cylinder 14. The drain orifice restricts flow from pump case through the check valve, to allow the check valve to be reasonably effective in limiting MDC drain port pressure to a level below case pressure. However, these components add cost, increase the size of the control, and have limited effectiveness due to limitations in sizing of the drain orifice (if the orifice is too small, it excessively restricts MDC drain flow during normal control operation).

FIG. 2 has many components in common with FIG. 1. Common components are referenced by the same numerals in both figures. The circuit of FIG. 2 avoids the problem cited above by connecting drain port 34 of solenoid valve 28 to pump case 26 pressure, insuring that no pressure difference can exist in servo 14 in the overridden mode. One advantage of this circuit is that the lines or passages which drain the control may be kept short since the control is typically mounted directly on the pump. Pressure drops are kept to a minimum. However, this circuit also subjects the hydraulically-released brake to pump case pressure in the overridden mode, which will partially or fully release it, slowing the rate of vehicle stopping. In a typical hydrostatic pump, case pressure can be 50 psi during normal operation and 100 psi at cold start, while typical hydraulically-released brakes are fully released between 75 and 150 psi.

OBJECTIVES OF THE INVENTION

Providing for safe and rapid vehicle stops has proven troublesome with conventional hydraulic circuits. Therefore, it is a primary objective of the present invention to provide a hydraulic circuit on a vehicle for rapidly and safely destroking a hydraulic pump and hydraulically releasing a brake to stop the vehicle.

A further objective of the present invention is to provide a hydraulic circuit which minimizes the pressure differences between the displacement control supply and drain ports such that the differential pressure between the respective ends of the servo cylinder is also minimized, ensuring that the swashplate seeks a neutral position during destroking and braking.

A further objective of the present invention is to provide a hydraulic circuit which drains fluid and thereby pressure to rapidly release a hydraulic brake for stopping a vehicle.

A further objective of the present invention is to provide a hydraulic circuit which assists in stopping a vehicle quickly.

A further objective of the present invention is to provide a hydraulic circuit which assists in stopping a vehicle safely.

A further objective of the present invention is to provide a hydraulic circuit which assists in stopping a vehicle without impairing the performance of the displacement control during normal operations.

A further objective of the present invention is to provide a cost effective and easy to manufacture hydraulic circuit for stopping a vehicle quickly.

A further objective of the present invention is to provide a hydraulic circuit which assists in stopping a vehicle without increasing the size of the control package.

SUMMARY OF THE INVENTION

This invention relates to a return to neutral and brake release circuit for hydrostatically propelled vehicles. The circuit includes a system fluid reservoir; a charge pump supplying fluid to a hydraulically-released brake and a displacement control for a hydrostatic transmission; and a solenoid valve for interrupting the flow of fluid to the brake and control so that the transmission will return to neutral and the brake be released to stop the vehicle. Most importantly, the circuit includes a set of drain passages connecting the solenoid, displacement control, and brake to the system reservoir. Connection of the drain lines to a common reservoir ensures immediate draining off trapped fluid and pressure in these devices when the solenoid interrupts flow. Therefore, this invention provides for timely engagement of the brake and return of the variable pump to neutral. The vehicle is stopped safely and quickly. By virtue of this circuit, the drain passages can be merged into a common drain passage before they reach the system reservoir. The circuit may include manual, hydraulic, or electrical controls. To save space and avoid external lines the solenoid and control may be incorporated into a single housing. The system reservoir is vented to the atmosphere to ensure low pressure in the drain lines and, thus, full engagement of the hydraulically-released brake.

DESCRIPTION OF THE PREFERRED EMBODIMENT

Figure 1:
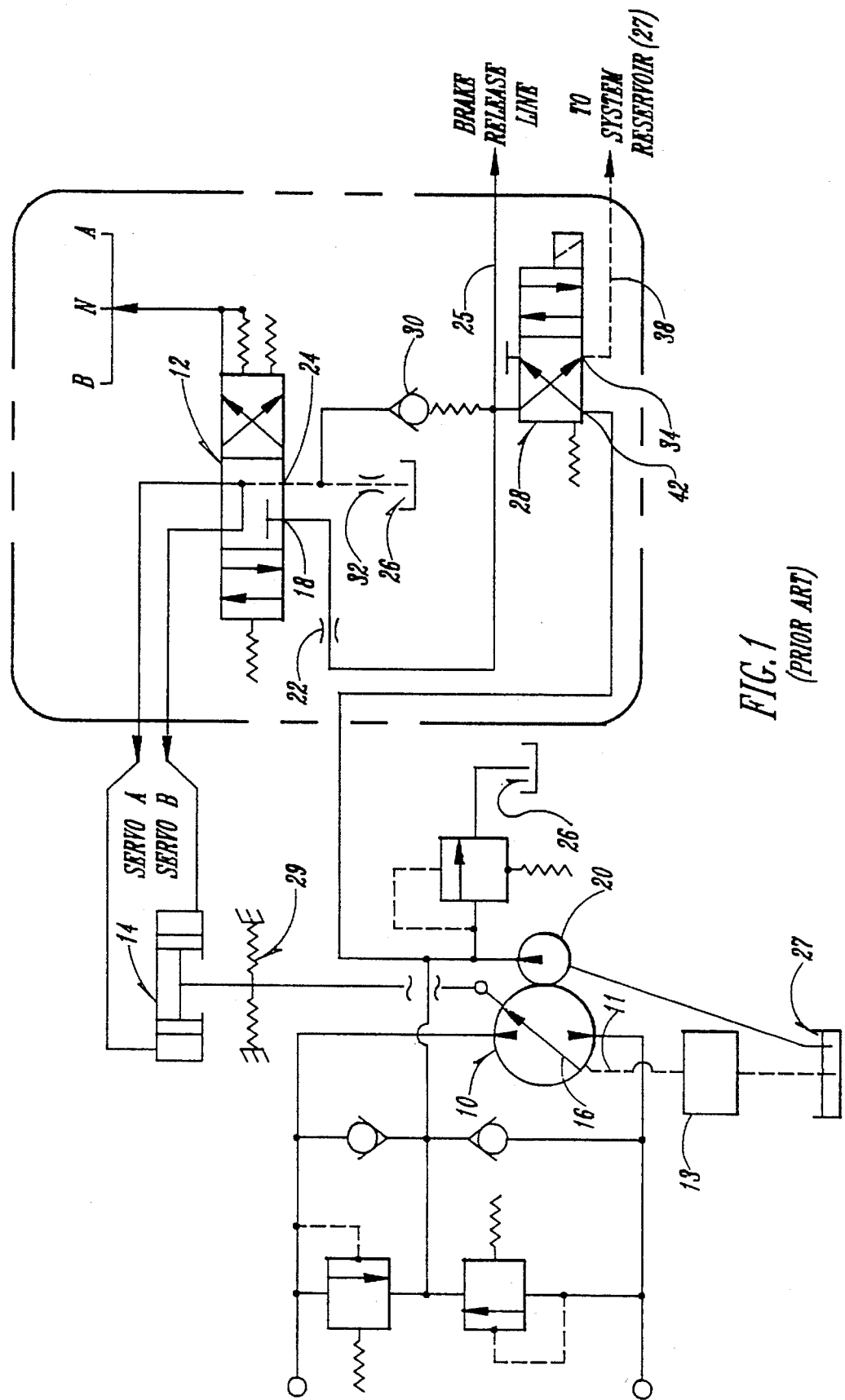
FIG. 1 is a schematic diagram of a conventional hydraulic circuit known in the art for destroking a hydrostatic pump and hydraulically releasing a service brake on a vehicle.
Figure 2:
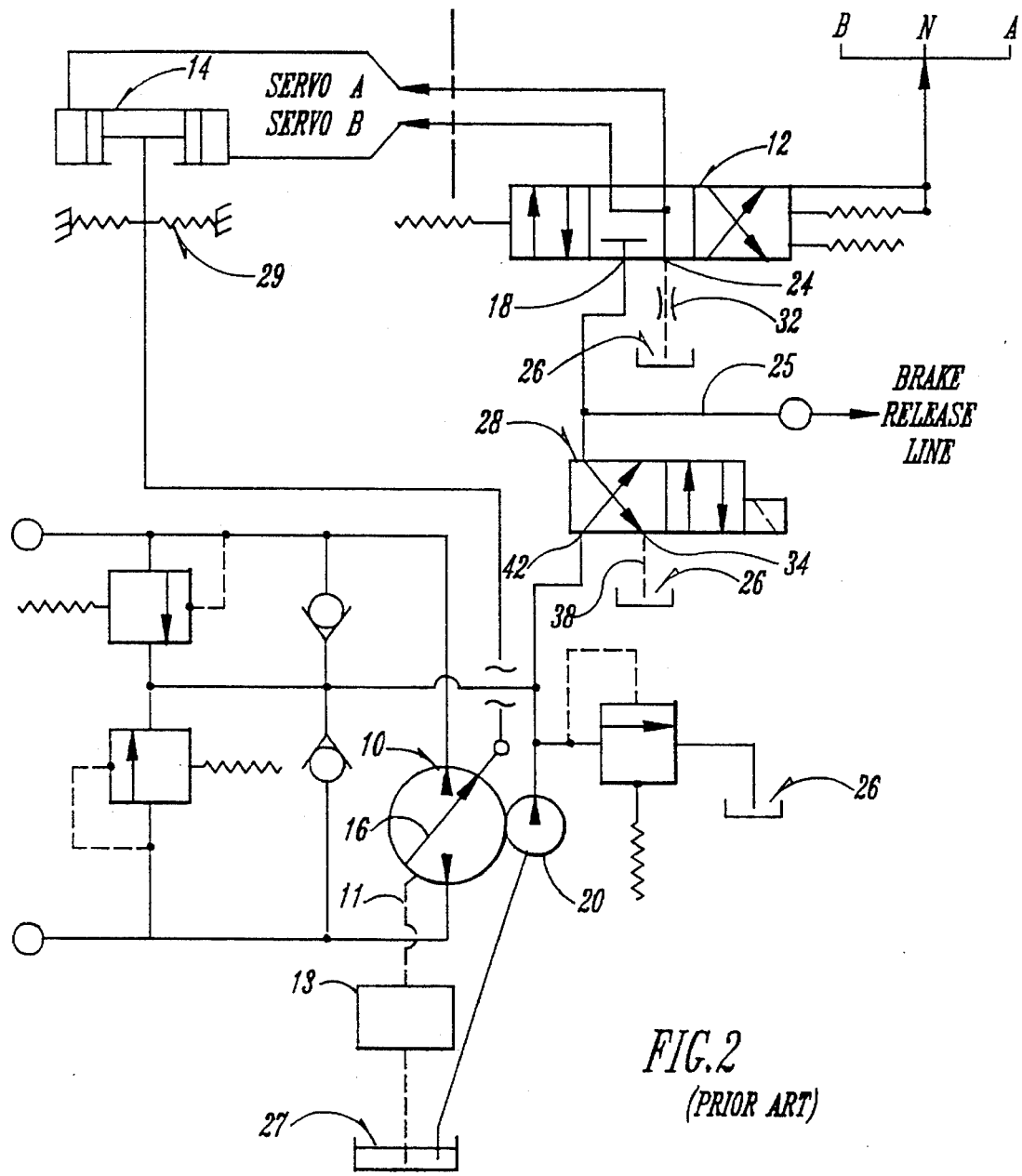
FIG. 2 is a schematic diagram of a prior art attempt to overcome the limitations inherent in the hydraulic circuit of FIG. 1.

With the notable exceptions described below, this invention has many components in common with the prior art shown in FIGS. 1 and 2. For consistency, the same reference numerals have been used in all three figures when the components are common.

Figure 3:
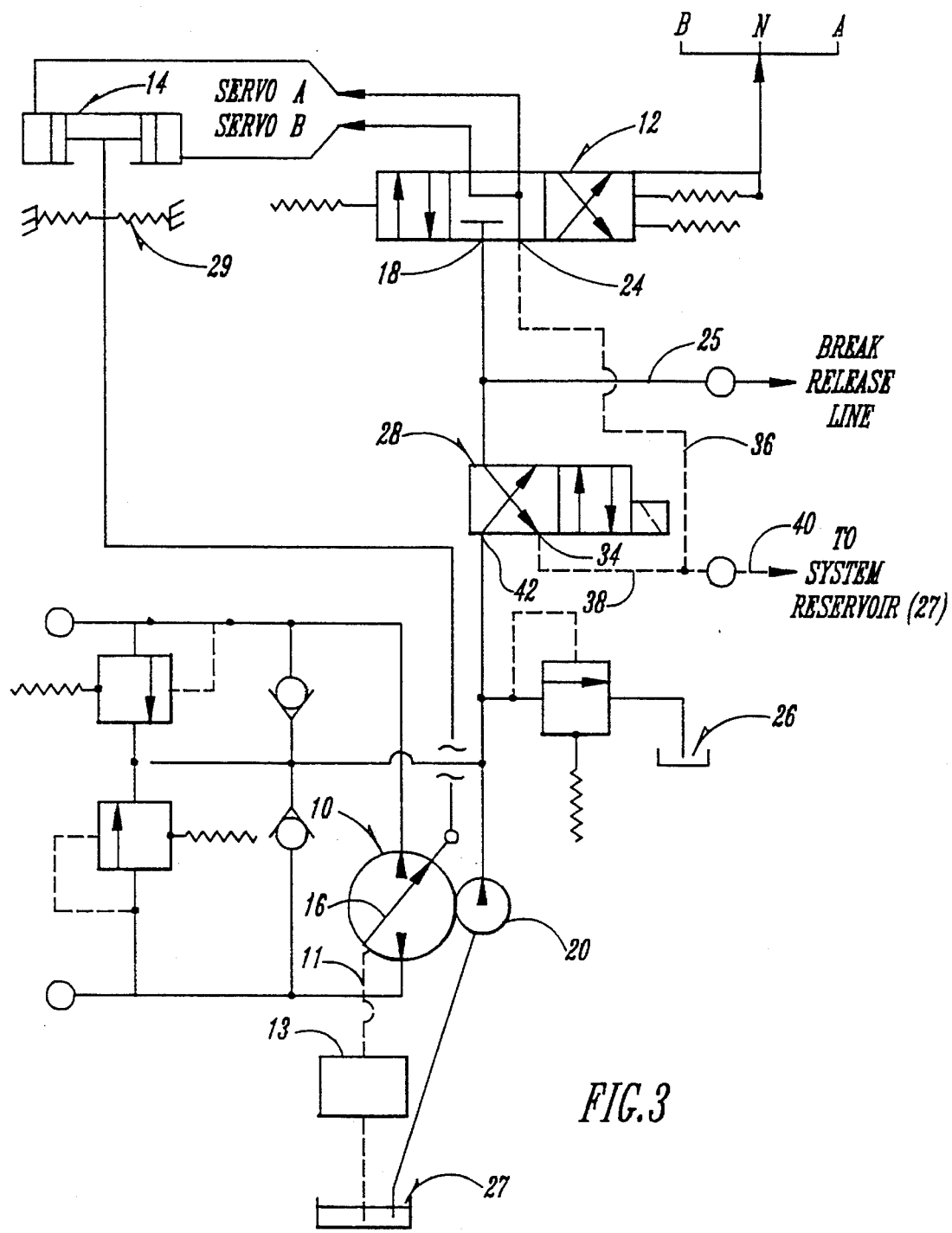
FIG. 3 is a schematic diagram of the hydraulic circuit of the present invention.

FIG. 3 shows the hydraulic circuit of this invention in detail. The circuit differs from the prior art in FIGS. 1 and 2 because the drain port 24 of the displacement control is connected by displacement control drain line 36 to solenoid drain line 38 which receives fluid from solenoid drain port 34. A manual displacement control is shown here, but the invention can be applied to hydraulic or electrical controls as well. The brake release line 25 drains through solenoid 28 and drain port 34. Common drain line 40 is routed to a vented system reservoir 27 in the preferred embodiment.

Since the system reservoir is vented to the atmosphere and negligible pressure drops occur in the lines, the pressures at drain ports 24 and 34 are equal and approximately zero when the control and solenoid are drained in this manner. The pressure at the brake will also be approximately zero. No undesirable pressure differentials exist. Therefore, the brake will be spring-activated into full and adequate engagement. The vehicle also will not experience hydrostatic creep since no pressure differential can result in the servo cylinder 14. While the drain line 36 for the displacement control may not be as short as that which is possible when the control is drained to the pump case, the operational advantages discussed below overshadow this shortcoming. Drained to a common line, the control and solenoid can be incorporated into a single housing to reduce the overall package size and avoid external lines or hoses.

OPERATION OF THE INVENTION

The operation of this invention is best understood by tracing the flow of hydraulic fluid during the two modes of operation: normal and overridden.

In the normal mode pump 10 delivers fluid to a motor (not shown) in a closed circuit to propel the vehicle. Fluid losses are replenished by charge pump 20. Charge pump 20 also delivers fluid, typically at a pressure of 100–300 psi, to the supply port 42 of solenoid valve 28. In the normal propel mode, solenoid 28 is electrically energized and shifted to the left from the position shown. As a result, fluid from the charge pump 20 is allowed to flow to the displacement control and hydraulically-released brake (not shown). This fluid pressure delivered to the brake prevents the spring-activated brake from being applied in the normal propel mode. The fluid also enters the supply port 18 of control 12. In the neutral position shown in FIG. 3, no forward or reverse movement of the vehicle is commanded. However, when the control lever 42 is commanded toward the A or B position, the control valve spool is directed to port fluid to the respective side (A or B) of servo cylinder 14. The servo cylinder 14 is connected to the swashplate 16 to vary the displacement of pump 10. The servo cylinder 14 responds to a pressure differential between passages A and B. If the pressure differential is great enough to overcome the centering springs 29 of the swashplate, the swashplate will displace fluid to the motor(s). Assuming the motors are at a fixed positive displacement, the vehicle will be propelled.

When the vehicle must be stopped quickly, the control must be overridden and the brake released. In this overridden mode, fluid flows from charge pump 20 to solenoid 28. But solenoid 28, when electrically de-energized, is positioned as shown and blocks the flow of fluid to the brake and the control 12. Control 12 is spring-centered to the neutral or center position shown and both sides (A and B) of the servo cylinder are drained to the system reservoir 27. The brake is engaged because release line 25 is also drained to system reservoir 27 through solenoid drain 34. Providing a common low pressure drain for the control and brakes keeps the pressure seen by the hydraulic brake low enough to ensure its adequate activation and engagement. It also means that there is an insufficient pressure differential in servo cylinder 14 to overcome the centering springs 29, the swashplate 16 must return to a neutral or zero displacement position. This reduces the possibility that the HST will cause the vehicle to creep. Thus, the brakes and HST control cooperate to rapidly stop the vehicle.

From the foregoing, it should be readily apparent that the invention accomplishes the objectives stated. This invention is contemplated to be useful with a variety of hydraulic pumps, control types, and solenoids or valve means.

What is claimed is:

1. In a wheeled vehicle propelled by a hydrostatic transmission, having a variable displacement pump fluidly connected to a motor in a closed circuit for propulsion and a hydraulically-released brake for stopping the vehicle, a return to neutral and brake release circuit comprising:

a system reservoir for holding fluid;

a charge pump for drawing fluid from said reservoir and providing pressurized flow of same;

a hydraulically-released brake operatively attached to the wheels of said vehicle and said charge pump;

a displacement varying means operatively connected to said variable displacement pump;

a control means for providing differential pressure command signals to said displacement varying means, said control means having a porting means, two outlet servo ports, an inlet supply port and a drain port;

a valve means for interrupting the flow of fluid to said brake and control means to stop said vehicle, said valve means having an outlet port fluidly connected to said brake and said control means at said inlet supply port, a supply port fluidly connected with said charge pump, and a drain port;

said displacement varying means connected to said variable displacement pump and said control means and responsive to differential pressure commands from said outlet servo ports;

a first drain passage fluidly connecting the drain port of said control means directly to said system reservoir;

a second drain passage hydraulically parallel to said first drain passage and fluidly connecting said valve means drain port with said system reservoir; and whereby when the valve means interrupts the flow of fluid from said charge pump to said brake, control means, and displacement varying means, residual fluid from said control means and displacement varying means in one branch and from said brakes in the other branch is drained by said hydraulically parallel passages to said system reservoir, immediately engaging said brake and returning said variable displacement pump to neutral, thereby stopping said vehicle quickly.

2. The circuit of claim 1 wherein said first and second drain passages are merged into a common drain passage before reaching said system reservoir.

3. The circuit of claim 1 wherein said control means is a manual displacement control.

4. The circuit of claim 3 wherein said porting means is an axially movable valve spool.

5. The circuit of claim 1 wherein said control means is of the electrical type.

6. The circuit of claim 1 wherein said control means is of the hydraulic type.

7. The circuit of claim 1 wherein said valve means is a solenoid valve.

8. The circuit of claim 7 wherein said solenoid valve and said control means are included within a single housing.

9. The circuit of claim 1 wherein said hydraulically released brake includes an activating spring and a hydraulic brake release line, whereby said brake is forced into engagement by said spring but for opposing force from the pressure in said release line such that when said opposing force is less than said spring force the brake will be applied.

* * * * *